Feb. 23, 1937. R. S. WALKER 2,071,806
AIR FILTER FOR VENTILATING SYSTEMS OR APPARATUS
Filed April 6, 1936 2 Sheets-Sheet 1

INVENTOR
Russell Walker
BY HIS ATTORNEYS

Feb. 23, 1937.  R. S. WALKER  2,071,806
AIR FILTER FOR VENTILATING SYSTEMS OR APPARATUS
Filed April 6, 1936  2 Sheets-Sheet 2
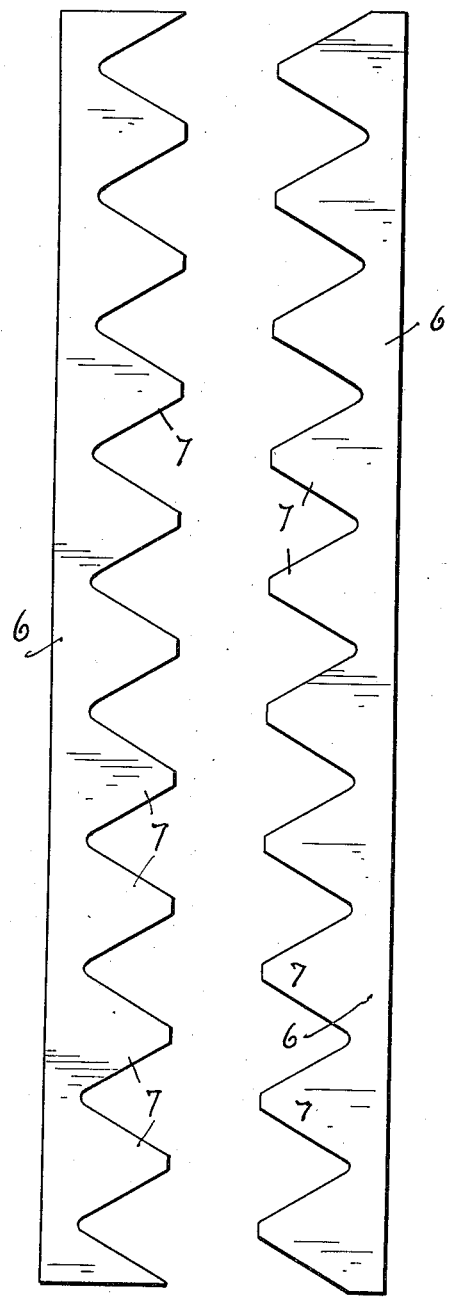
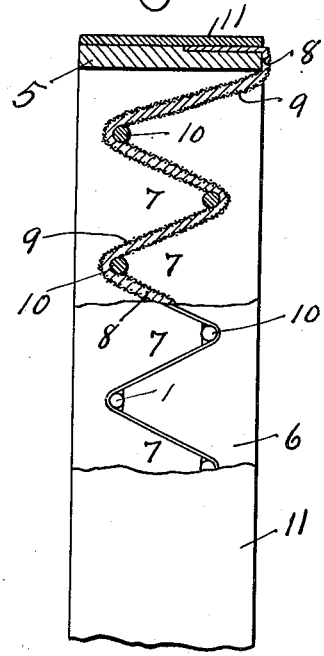
INVENTOR
Russell Walker
BY HIS ATTORNEYS Patented Feb. 23, 1937

2,071,806

UNITED STATES PATENT OFFICE 2,071,806

AIR FILTER FOR VENTILATING SYSTEMS OR APPARATUS

Russell S. Walker, Duluth, Minn., assignor to Universal Air Filter Corporation, Duluth, Minn., a corporation of Minnesota Application April 6, 1936, Serial No. 72,903

3 Claims. (Cl. 183—71)

My present invention relates to "Air filters for ventilating systems or apparatus" which employ one or more filtering units for filtering or taking dust and other impurities from the air; and, generally stated, the invention consists of the novel devices, combinations of devices and arrangement of parts hereinafter described and defined in the claims.

The primary object of this invention is the provision of an efficient and readily changeable air filter of small cost so as to permit the same to be quickly and conveniently removed and destroyed or abandoned whenever the filtering media has become choked up with collected dust, dirt, pollen or other impurities. Nevertheless, this invention involves certain novel and important features which may be employed to advantage in an air filter of more permanent character, and in which, for example, only the filtering media will be thrown away and replaced.

A commercial form of the invention is illustrated in the accompanying drawings wherein like characters indicate like parts throughout the several views.

Referring to the drawings:

Fig. 3 is a fragmentary vertical section taken on the line 3—3 of Fig. 1; and

Fig. 4 is an elevation showing complemental bars which, when put together, form a side of a marginal frame of the filtering unit.

Figure 1:
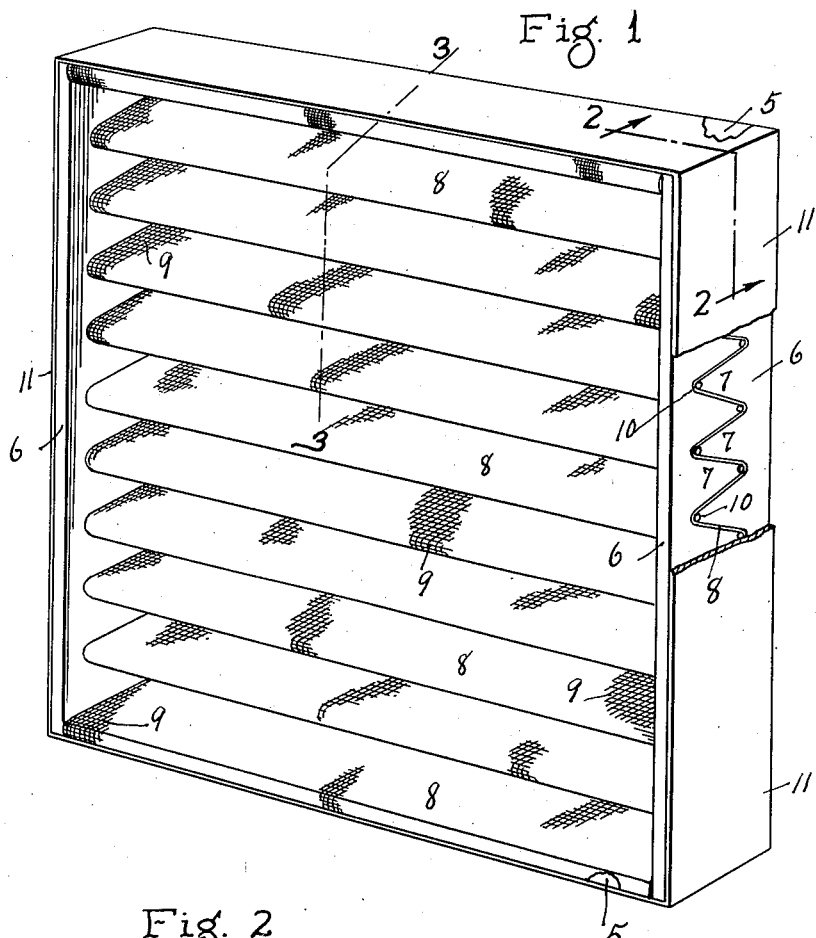
Fig. 1 is a perspective with some parts broken away showing the improved filter or filtering unit.

This filtering unit comprises a marginal rectangular frame and a filtering media. The frame may, of course, be set in any suitable position, but as illustrated in the drawings, the frame is made up of top and bottom plates 5 and elongated side plates, which latter has an important novel feature, being made up each of two complemental plates or bars 6. These complemental bars 6 are formed on the opposing edges with intermeshing V-shaped teeth or projections 7.

The filtering media is a fibrous sheet 8 preferably of cotton or other fibrous material having a sheet-like form that is corrugated or bent to form parallel, alternated, V or U-shaped folds, the edges of which project and are tightly clamped by the surfaces of the meshing teeth or projections 7 and is thereby firmly held and dust tight joints are formed between the said sheet and the sides of the frame.

To hold the cotton or other fibrous sheet or media in a U or V-shaped form, a reinforcing screen 9 of wire or stiff fiber may be used.

Figure 2:
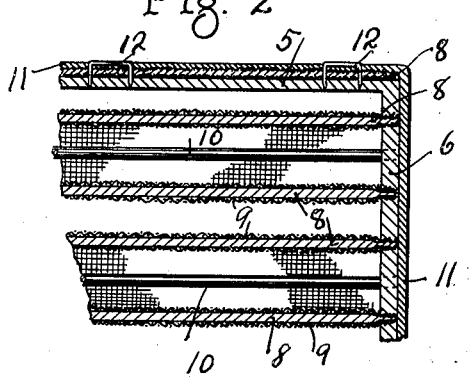
Fig. 2 is a fragmentary section taken on the line 2—2 of Fig. 1.

In some instances, especially where the frames are narrow, a stiff screen-like covering clamped at its edges between the teeth of the frame bars 6 may be found sufficient to maintain the proper corrugated form of the filtering media. For general purposes, however, the corrugations of the filtering media or sheet 8 will be reinforced and held in position by ridge-rods or small bars 10 placed at the ends of the teeth 7 and pressed into the angles of the corrugations of said filtering sheet. By the pressure between the frame bars 6, both the ridge-rods and sheet will be firmly held. In practice, the frame bars 6 will be rigidly secured to the frame bars 5 so that the frame bars 6 cannot separate; this fastening of the bars 6 to the bars 5 may be accomplished by brads, metal clips or any of the well-known low cost devices used for such purposes. Inasmuch as the filtering units are frequently assembled in groups or plural arrangement within a master-frame, it is desirable to cover the exterior of the frame with a strip of material such, for example, as felt indicated at 11, and which strip will form a dust-tight joint between the frame of the unit and the master-frame. In Fig. 2 the covering sheet 11 and the upper and lower edges of the filtering sheet are shown as secured to the frame by U-shaped staples 12.

From the foregoing it is evident that the intermeshing teeth of the complemental bars determine the shape of the end portions of the corrugations of the filtering sheet and tend to maintain that corrugated form in the entire sheet. The ridge-rods or screen, however, reinforce the intermediate portions of the corrugated sheet and maintain the corrugated form thereof throughout their length. Obviously a structure such as described can be made from sheet materials and quickly assembled at very low cost, making it feasible to destroy or abandon the entire filtering unit when it is rendered inefficient by the accumulation of dust in the filtering media.

The air pressure against the filtering sheet is assumed to be from right toward the left in respect to Fig. 3, and in such an arrangement it is evident that the right hand rods are of more importance than the left hand rods inasmuch as the former prevents the corrugations of the seat from being buckled by tensile strain, while the left hand rods do not resist the air pressure, but simply prevent the collapsing of the corrugations of the sheet under forces other than the normal pressure of the air that is drawn or forced through the filtering sheet. From this statement it will be understood that in some cases the left hand rods, as viewed in Fig. 3, may be dispensed with even where the frame and the filtering sheet are of considerable width.

The elements of the frame and the ridge rods may be made of various different materials. In most instances, however, the frame is made of wood, fiber boards or other sheet material so that it, as well as the filtering media, may be destroyed or abandoned when the filtering media has been clogged. Even the ridge-rods might be made of wood in which case the entire unit may be readily destroyed by burning.

From the foregoing it will be understood that the filtering unit illustrated is capable of various modifications as to details of construction and arrangement of parts within the scope of the invention herein disclosed and claimed.

What I claim is:

1. A filtering unit comprising a rectangular frame, a corrugated filtering sheet and ridge-rods, said frame having opposite sides made up of complemental bars having intermeshing teeth, said ridge-rods being positioned in the crotches of the corrugations of said sheet with their ends held seated between the crotches and points of the teeth of said complemental bars.

2. A filtering unit comprising a rectangular frame, a corrugated filtering sheet and ridge-rods, said frame having opposite sides made up of complemental bars having intermeshing teeth, said ridge-rods being positioned in the crotches of the corrugations of said sheet with their ends held seated between the crotches and points of the teeth of said complemental bars, and the edges of said corrugated filtering sheet being interposed between the intermeshing teeth of said complemental bars.

3. The structure defined in claim 1 in which the ridge-rods therein noted are between one face of the frame, and in further combination with other ridge-rods at the other face of the frame.

RUSSELL S. WALKER.